Figure 1:
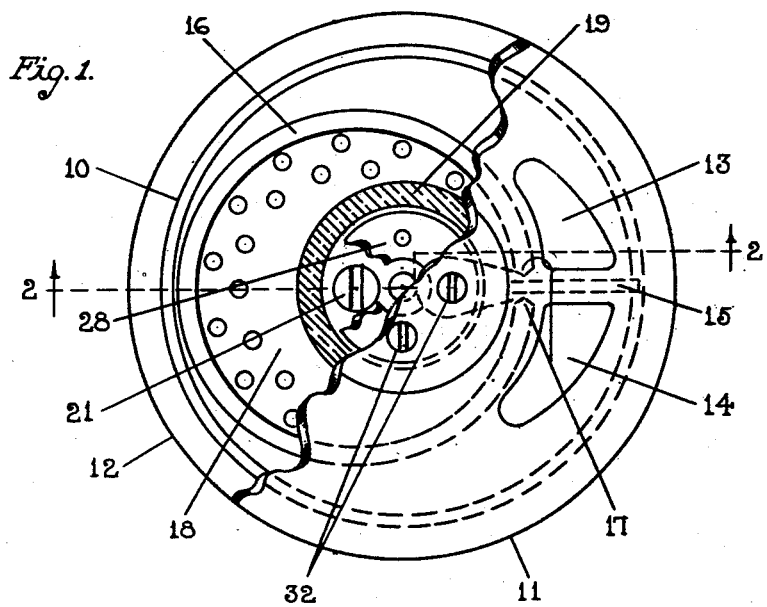

Sept. 28, 1948.    C. P. BERGMAN    2,449,973

FLUID METER

Filed July 17, 1944

*INVENTOR.*
*CHARLES P. BERGMAN*
BY
*ATTORNEYS*

Patented Sept. 28, 1948

2,449,973

UNITED STATES PATENT OFFICE 2,449,973

FLUID METER

Charles P. Bergman, Brooklyn, N. Y., assignor to Rockwell Manufacturing Company, a corporation of Pennsylvania.

Application July 17, 1944, Serial No. 545,237

9 Claims. (Cl. 73—257)

This invention relates to fluid meters and more particularly to a meter of the oscillating piston displacement type, such as that shown in the patent to Alexander R. Whittaker 2,338,152, January 4, 1944.

In the operation of such fluid meters, there is more or less resistance to the free oscillating motion of the piston, due to frictional contact between the piston and the walls of the measuring chamber or other associated relatively fixed parts. This is particularly true in the lower range of fluid pressures, and has a tendency to cause intermittent instead of desired continuous oscillatory motion of the piston within the measuring chamber. Therefore, since the piston drives a gear train operating a totalizing register, the operation of the register may be erratic and unreliable.

It is, therefore, the primary purpose of my present invention to provide simple and effective means for increasing the operating efficiency and accuracy of such fluid meters by substantially eliminating frictional resistance to the oscillatory movement of the meter piston, thereby also assuring the noiseless operation of the meter.

A more particular object of the invention is to provide means controlling the operative position of the piston with respect to the walls of the measuring chamber which embodies a stationary member and a movable member fixed to the oscillatory piston, said members being cooperatively associated and acting to sustain the piston substantially in a position of floating equilibruim within the fluid medium throughout the cycle of oscillatory motion.

A more particular object of the invention in one embodiment thereof resides in the provision of a permanent magnet having a fixed connection with the oscillatory piston, substantially at its axial center, and a cooperating adjustable armature whereby the influence of the magnetic forces upon said piston may be accurately controlled to support or suspend said piston for oscillating motion within the measuring chamber and substantially frictionless movement with respect to the chamber walls and other relatively fixed parts.

It is also a further object of my invention to provide a desirable improvement in fluid meters as above characterized in which structural simplicity and low fabrication costs are achieved, combined with durability, freedom from maintenance expense, and maximum efficiency in operation under variable fluid pressures.

With the above and other subordinate objects in view, the invention consists in the improved fluid meter and in the construction and relative arrangement of its several cooperating parts as will hereinafter be more fully described, illustrated in the accompanying drawings and subsequently incorporated in the subjoined claims.

Figure 2:
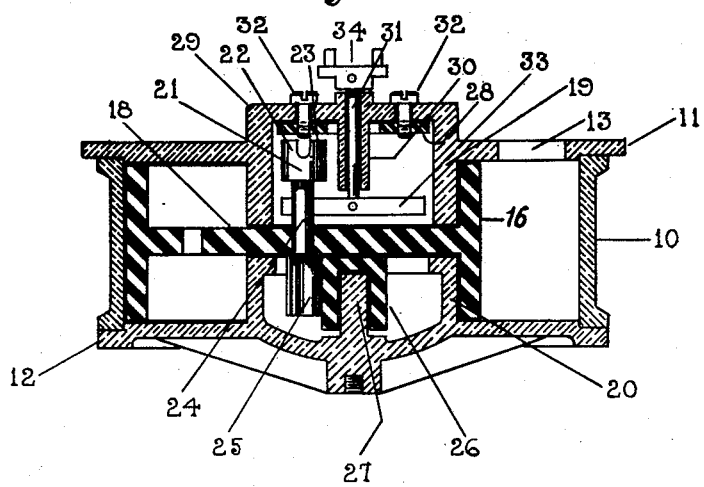

In the drawing, wherein I have illustrated one simple and practical embodiment of my invention and in which similar reference characters designate corresponding parts in the different views thereof:

Figure 1 is a top plan view, a part of the top head of the fluid measuring chamber being broken away; and Figure 2 is a vertical sectional view taken substantially on the line 2—2 of Figure 1.

Referring in greater detail to the drawings, the measuring chamber comprises a cylindrical body wall 10 having a top closure head 11 and a bottom closure head 12. One or both of the closure heads may be provided with a fluid inlet port 13 and an outlet port 14 between which the division or baffle plate 15 is vertically disposed and extends inwardly through a vertical slot indicated at 17 in the annular wall 16 of the oscillatory piston within the measuring chamber. The sectional form of this piston and the mounting and arrangement of plate 15 in cooperative relation therewith are preferably substantially the same as that shown in the Whittaker patent above identified.

The oscillatory piston also includes a perforated horizontal web 18, and the vertical dimension of the annular wall 16 of said piston is somewhat less than the distance between the opposing internal parallel faces of the heads 11 and 12 of the measuring chamber. These chamber heads are formed with the axially aligned hollow concentric bosses 19 and 20, respectively, positioned within the annular wall of the piston and having their opposed ends spaced apart for a distance slightly exceeding the thickness of the piston web 18. It will therefore be understood that in a vertical medial position of the oscillatory piston, the upper and lower edges of the annular wall 16 thereof have clearance relation to the internal faces of the heads 11 and 12, respectively, while the ends of the bosses 19 and 20 on said head are also in clearance relation to the upper and lower faces of the piston web 18.

My present improvement is concerned with means for suspending or sustaining the oscillatory piston in the measuring chamber in such medial position with respect to the associated stationary parts so that said piston will occupy an operative position of substantially floating equilibrium within the liquid contained in the measuring chamber and with the axis of said piston at all times perpendicular to the path of oscillation of the piston. To this end, in one embodiment of my invention, I provide a permanent magnet 21 which, in the present instance, is of general cylindrical form and provided with the spaced pole pieces 22 and 23, respectively. This magnet is suitably fixed to one end of a rod or stem 24, which in turn is fixed in the piston web 18 substantially at its axial center. Below said web, the rod 24 has a cylindrically enlarged portion 25 movable within the boss 20 on the bottom head 12 of the measuring chamber around a hard rubber sleeve 26 enclosing the axially centered stem 27 integrally formed with the head 12. The upper surface of this sleeve lies substantially in the plane of the upper end face of the boss 20. If desired stem 24 may be of non-magnetic material.

An armature is cooperatively associated with the magnet 21 and, as herein shown, is preferably in the form of a flat ring or annulus 28 of soft iron. This armature ring is positioned within an external prolongation 29 of boss 19 and surrounds the sleeve 30 extending downwardly therefrom which forms a bearing for a vertical shaft 31. The armature ring 28 is adjustable, to vary the air gap between the lower face of said ring and the magnet poles 22 and 23, by means of the adjusting screws 32 mounted in the external boss extension 29.

To the lower end of the vertical shaft 31 an arm 33 is suitably fixed, with which the rod 24 cooperates in the oscillating movement of the piston to rotate said shaft. To the upper end of the shaft 31 a member 34 is fixed and has driving connection with a gear train for a totalizing register (not shown). The register and gear train are mechanism well known in the art and further description of the same herein is therefore not required.

It will be evident from the above description that in the oscillatory motion of the piston the magnet poles 22 and 23 are at all times in opposed relation to the lower face of the armature ring 28. By properly adjusting said armature ring, the magnetic flux forces are caused to sustain or suspend the piston through the rod connection 24 in a position of substantially balanced equilibrium within the fluid flowing through the measuring chamber and with the upper and lower piston surfaces in non-contacting clearance relation to the chamber heads 11 and 12 and the boss extensions 19 and 20 thereof. In other words, by means of my present invention, the weight of the piston is neutralized so that free, continuous oscillatory motion of the piston unimpeded by frictional resistance will be obtained, even when the meter is operating under comparatively low fluid pressures.

The several parts of the measuring chamber are made of bronze or other material which will not have a de-magnetizing effect upon the magnet 21, while the piston and the sleeve 26 are preferably made of hard rubber.

It will be appreciated that the invention herein disclosed provides a simple device, readily applicable to fluid meters of the piston displacement type without materially increasing the production cost thereof, and which will insure the efficient silent operation of the meter under various operating conditions which may be encountered. It will of course be apparent that while I have herein described and shown the magnet 21 as of cylindrical form, this magnet may be of various other shapes and any suitable means employed for the purpose of attaching the magnet to the oscillatory piston.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter of the oscillating piston displacement type, a measuring chamber disposed with its axis vertical, an oscillatory piston within said chamber, there being clearance between said piston and said measuring chamber permitting vertical movement of said piston in said chamber, and means sustaining said piston substantially in a position of floating equilibrium within the fluid medium throughout its cycle of oscillatory motion, said means comprising a permanent magnet and a cooperatively associated armature member, one of which is fixed to the piston for oscillatory movement therewith.

2. The combination defined in claim 1 in which said magnet is fixed to the oscillatory piston approximately at its axial center.

3. The combination defined in claim 1 in which said magnet is fixed to the oscillatory piston, and wherein means is provided for adjustably positioning the armature member with respect to the magnet poles.

4. In a fluid meter of the oscillating piston displacement type, a measuring chamber, an oscillatory piston within said chamber, a permanent magnet fixed to the piston approximately at its axial center, an annular armature member substantially concentric to the path of movement of the magnet with the oscillatory piston, and adjustable means, mounting the armature member on a wall of the measuring chamber, for positioning said member relative to the magnet poles, whereby the weight of the piston is compensated by magnetic forces and said piston sustained substantially in a position of floating equilibrium within the fluid medium, throughout its cycle of oscillatory motion.

5. In a fluid meter having a measuring chamber, a piston oscillatable within said chamber in response to fluid flow through the chamber, a register drive connected to said piston and magnetic means in said meter, distinct from said register drive, exerting a sustaining force in opposition to the force of gravity due to the weight of said piston for sustaining said piston in substantially floating equilibrium so as to reduce frictional opposition to oscillation of said piston.

6. In the fluid meter defined in claim 5, means accessible from externally of the measuring chamber for adjusting the absolute sustaining force of said magnetic means.

7. In a fluid meter, a measuring chamber, a metering member movable within said chamber in response to the fluid pressure, a register device mechanically driven by said member, and magnetic means operative independently of said register drive to position said member in the measuring chamber for unimpeded movement in a fixed path substantially in a position of floating equilibrium within the fluid medium.

8. In a fluid meter having a measuring chamber, a piston oscillatable within said chamber in response to fluid flow therethrough, register drive means associated with said piston, a magnetic member carried by the piston and fixed thereto for oscillatory movement therewith, and a relatively stationary annular magnetic member adapted to be magnetically coupled with said piston carried member mounted on the wall of the measuring chamber in substantially concentric relation to the path of movement of said movable member and magnetically coacting therewith so as to floatingly sustain said piston in the fluid medium for substantially frictionless motion relative to the walls of the measuring chamber.

9. The fluid meter defined in claim 8, in which said movable member is a permanent magnet and said stationary member is an armature to which both poles of the magnet are opposed at one side of the armature axis.

CHARLES P. BERGMAN.

REFERENCES CITED

The following references are of record in the file of this patent:

UNITED STATES PATENTS

| Number | Name | Date |
| --- | --- | --- |
| 75,313 | Stein | Mar. 10, 1868 |
| 608,602 | Hill | Aug. 9, 1898 |
| 1,024,741 | Nash | Apr. 30, 1912 |
| 1,179,208 | Monard | Apr. 11, 1916 |
| 1,608,231 | Bradley | Nov. 23, 1926 |
| 1,999,684 | Bradley | Apr. 30, 1935 |
| 2,172,500 | Clements | Sept. 12, 1939 |
| 2,299,406 | Potter | Oct. 20, 1942 |
| 2,311,382 | Hansen | Feb. 16, 1943 |
| 2,354,563 | Weisse | July 25, 1944 |

FOREIGN PATENTS

| Number | Country | Date |
| --- | --- | --- |
| 636,699 | Germany | Oct. 13, 1936 |